United States Patent

Zimmer et al.

Patent Number: 5,179,526
Date of Patent: Jan. 12, 1993

[54] PROCESS FOR CORRECTING THE ROTATIONAL SPEEDS OF VEHICLE WHEELS DETERMINED BY WHEEL SENSORS

[75] Inventors: Richard Zimmer, Fellbach; Armin Müller, Backnang; Martin Klarer, Kernen-Stetten, all of Fed. Rep. of Germany

[73] Assignee: Mercedes-Benz AG, Stuttgart, Fed. Rep. of Germany

[21] Appl. No.: 709,308

[22] Filed: Jun. 3, 1991

[30] Foreign Application Priority Data

Jun. 22, 1990 [DE] Fed. Rep. of Germany ......... 019886

[51] Int. Cl.$^5$ .............................................. G01P 3/44
[52] U.S. Cl. ................................. 364/565; 364/426.02; 303/102; 324/160
[58] Field of Search ....................... 364/426.02, 426.03, 364/565; 180/197; 303/95, 100, 102, 103, 105, 106; 324/160, 166

[56] References Cited

U.S. PATENT DOCUMENTS

| 4,321,676 | 3/1982 | Ohmori et al. | 364/426.02 |
| 4,566,737 | 1/1986 | Masaki | 364/426.02 |
| 4,718,013 | 1/1988 | Kubo | 303/95 |
| 5,016,179 | 5/1991 | Utzt | 364/426.02 |
| 5,019,984 | 5/1991 | Masaki et al. | 303/95 |

Primary Examiner—Gary Chin
Attorney, Agent, or Firm—Evenson, Wands, Edwards, Lenahan & McKeown

[57] ABSTRACT

A method for correcting the rotational speeds of vehicle wheels determined by wheel sensors, a measurement of wheel speeds of the wheels of a vehicle being carried out, with specific driving conditions being that the vehicle is being neither accelerated nor braked and has no transverse acceleration. In a first part of the method, a matching of the measured wheel speeds is carried out under the specific driving conditions when the condition that the vehicle speed is below a first threshold value is satisfied. The matching of the measured wheel speeds is carried out by determining a matching factor for each of the two vehicle sides, so that, for example for the left vehicle side, matched wheel speeds are obtained from the measured wheel speeds. One of the matched wheel speeds of the left vehicle side is made equal to the associated measured wheel speed and the other of the two matched wheel speeds of the left vehicle side is obtained from the associated measured wheel by multiplying by the matchine factor of the left vehicle side, in such a way that the two matched wheel speeds of the left vehicle side assume the same value. In a second part of the method, the measured wheel speeds are balanced under the specific driving conditions when the condition that the vehicle speed is above a threshold value is satisfied. The balancing is carried out by determining a balancing factor for each wheel in relation to a reference wheel, in such a way that the balance wheel speed and the wheel speed of the reference wheel coincide with one another, and the measured wheel speeds are multiplied by the balancing factors determined in the second part of the method.

14 Claims, 3 Drawing Sheets

PROCESS FOR CORRECTING THE ROTATIONAL SPEEDS OF VEHICLE WHEELS DETERMINED BY WHEEL SENSORS

BACKGROUND AND SUMMARY OF THE INVENTION

The present invention relates to a method for correcting the rotational speeds of vehicle wheels determined by wheel sensors, and includes the steps of measuring wheel speeds of the individual wheels of a vehicle, and determining balancing factors of the individual wheels under specific driving conditions, the specific driving conditions being that the vehicle is being neither accelerated nor braked and has no transverse acceleration.

A process of the above type is already known from German Patent Document DE 3,738,914 A1, and according to this process the wheel pair of which the wheel speeds differ the least is determined during slip-free driving. An average value is formed from these wheel speeds, and this average value, when related to the wheel speeds of the other wheels, provides a correction value by means of which the other wheel speeds are corrected. This process is carried out only when no slip occurs on the wheels and when no curve is being negotiated. The occurrence of slip can be detected from the appearance of signals of an anti-lock system (ABS) and/or a drive-slip control (ASR). It is stated in this Patent Document that the steering-angle signal can be evaluated for the purpose of detecting the negotiation of a curve.

An object of the present invention is to provide a process for correcting the rotational speeds of vehicle wheels determined by wheel sensors, in such a way that the correction of the rotational speeds of vehicle wheels determined by wheel sensors is simplified in terms of the signal acquisition.

This and other objects are achieved by the present invention which provides a method for correcting the rotational speeds of vehicle wheels determined by wheel sensors, and includes the steps of measuring wheel speeds of the individual wheels of a vehicle, and determining balancing factors of the individual wheels under specific driving conditions, the specific driving conditions being that the vehicle is being neither accelerated nor braked and has no transverse acceleration. In a first part of the method, the measured wheel speeds are matched under the specific driving conditions and when the vehicle speed is below a first threshold value, the vehicle speed and the specific driving conditions being determined from the measured wheel speeds. The matching of the measured wheel speeds includes the step of determining a matching factor for each of the two vehicle sides so that matched wheel speeds are obtained from the measured wheel speeds that are associated with the matched wheel speeds. One of the matched wheel speeds of the left vehicle side is made equal to its associated measured wheel speed, and the other of the two matched wheel speeds of the left vehicle side is obtained from its associated measured wheel speed by multiplying by the matching factor of the left vehicle side, in such a way that the two matched wheel speeds of the left vehicle side assume the same value. One of the matched wheel speeds of the right vehicle side is made equal to its associated measured wheel speed and the other of the two matched wheel speeds of the right vehicle side is obtained from its associated measured wheel speed by multiplying by the matching factor of the right vehicle side, in such a way that the two matched wheel speeds of the right vehicle side assume the same value.

In a second part of the method, the wheel speeds are measured again to provide newly measured wheel speeds. The newly measured wheel speeds are balanced under the specific driving conditions and when the condition that the vehicle speed is above a second threshold value is satisfied. The newly measured wheel speeds are used to determine, with the matching factors being taken into account, the vehicle speed and the specific driving conditions. The step of balancing includes fixing one of the individual vehicle wheels as a reference wheel and determining a balancing factor for each individual vehicle wheel in relation to this reference wheel, in such a way that the balanced wheel speed coincides with the wheel speed of the reference wheel. Correcting measurements of wheel speeds measured after the balancing step are made by multiplying the wheel speeds measured after the balancing step by the determined balancing factors.

One of the advantages of the present invention in relation to the known state of the art is that there is no need to use a steering-angle sensor. Apart from the wheel speeds, according to the certain embodiments, only signals which can be detected simply and accurately, such as, for example, the appearance of ABS or ASR signals, are used.

In the method according to the present invention, the general driving situation in terms of the factors of vehicle speed $v_{veh}$ and transverse acceleration $a_q$ is estimated from the order of magnitude and ratio of initially uncorrected wheel speeds $\Omega_u$. Furthermore, an estimation of the drive slip or brake slip $\rho$ is carried out at the same time. In the range of low transverse accelerations $a_q$, the vehicle wheels on the individual vehicle sides run approximately on identical path curves, so that the speed of the front wheels $\Omega_{vl}$, $\Omega_{vr}$, and rear wheels $\Omega_{hl}$, 106 hr on the respective vehicle sides correspond with close approximation to one another when the dynamic wheel radii $R_{dyn}$ are equal. A further precondition, here, is that a negligible drive and brake slip $\rho$ should occur.

Since a deviation of the dynamic wheel radii of a plurality of wheels with an increasing vehicle speed $v_{veh}$ leads to a speed difference $\delta\Omega$ of increasing amount, in the range of low vehicle speeds it is more easily possible to infer transverse acceleration from the difference between the wheel speeds of wheels of one axle, since as a result of different dynamic wheel radii the speed differences assume a smaller amount in this speed range. If a low transverse acceleration is detected in the range of low vehicle speeds, the speeds of the vehicle wheels on the individual vehicle sides are matched respectively at the front and at the rear. This matching can be carried out by providing the wheel speeds of the wheels of the rear axle with a matching factor, in such a way that the speed of the right rear wheel corresponds to the speed of the right front wheel and the speed of the left rear wheel corresponds to the speed of the left front wheel.

Subsequently, in the range of higher vehicle speeds a balancing of the wheel speeds is carried out by fixing the speeds of all the vehicle wheels in relation to a reference wheel during a driving of the vehicle at least virtually free of transverse acceleration. Driving free of transverse acceleration is detected when the difference between the wheel speeds averaged on the two axles becomes equal to 0.

DETAILED DESCRIPTION OF THE DRAWINGS

Figure 1A:
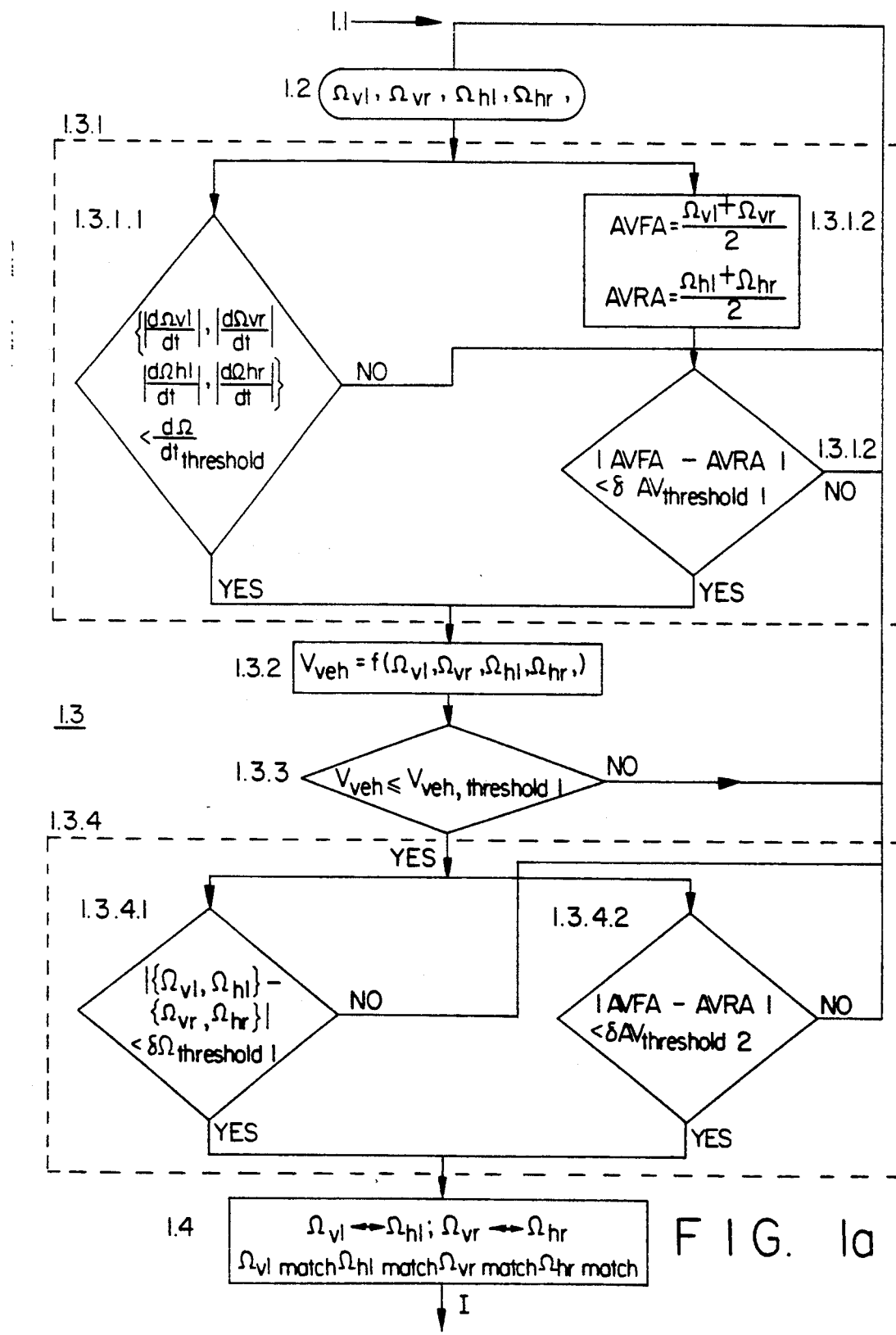
FIGS. 1a and 1b a single flow of an embodiment of the method according to the present invention.

As is evident from FIG. 1a, in the method according to the invention, on a 2-axle vehicle with in each case two wheels on each axle the wheel speeds of all four wheels are detected when the execution of the process has been initiated by the signal 1.1. In step 1.2, the wheel speeds $\Omega_{vl}$, $\Omega_{vr}$, $\Omega_{hl}$ and $\Omega_{hr}$ are measured.

In step 1.3, the driving state of the vehicle is derived from the wheel speeds $\Omega_{vl}$, $\Omega_{vr}$, $\Omega_{hl}$ and $\Omega_{hr}$. and It is first established, in step 1.3.1, whether the vehicle is being accelerated or braked. This can be carried out, according to step 1.3.1.1, by a time differentiation of the measured wheel speeds $\Omega_{vl}$, $\Omega_{vr}$, $\Omega_{hl}$ and $\Omega_{hr}$. If the amount of the wheel accelerations $d\Omega_{vl}/dt$, $d\Omega_{vr}/dt$, $d\Omega_{hl}/dt$ and $d\Omega_{hr}/dt$ thus determined is below a predetermined threshold value $d\Omega/dt_{threshold}$, it can be concluded that the vehicle is being neither accelerated nor braked. According to step 1.3.1.2, this check can also be conducted by forming the average value AVFA of the wheel speeds of the front axle according to the equation:

$$AVFA = (\Omega_{vl} + \Omega_{vr})/2$$

and the average value AVRA of the wheel speeds of the rear axle according to the equation:

$$AVRA = (\Omega_{hl} + \Omega_{hr})/2.$$

If the amount of the difference between the two average values AVFA and AVRA is below a threshold value $\delta AV_{threshold}$, it can likewise be determined from this that the vehicle is being neither accelerated nor braked. If it is detected in step 1.3.1 that the vehicle is being accelerated or braked, the method according to the present invention is suspended by causing a return to step 1.2. Otherwise, a transfer to step 1.3.2 takes place.

In step 1.3.2, the vehicle speed $v_{veh}$ is derived from at least one of the measured wheel speeds $\Omega_{vl}$, $\Omega_{vr}$, $\Omega_{hl}$ and $\Omega_{hr}$. Advantageously, this is carried out by averaging a plurality of these wheel speeds. The wheel speeds of the wheels of the nondriven axle of the vehicle can thus be used especially advantageously.

According to step 1.3.3, a check is then made as to whether the vehicle speed $v_{veh}$ is below a first threshold value $v_{veh,threshold1}$. A possible order of magnitude for this threshold value $v_{veh,threshold1}$ is of the order of magnitude of approximately 20–40km/h. If the vehicle speed $v_{veh}$ is above the threshold value $v_{veh,threshold1}$, the method according to the invention is suspended by causing a return to step 1.2. Otherwise, a transfer to step 1.3.4 takes place.

In step 1.3.4, a check is then made as to whether the transverse acceleration $a_q$ is below a predetermined threshold value $a_{q,threshold1}$. According to step 1.3.4.1, this check can be conducted, for example, by comparing the wheel speeds of wheels of one axle on different vehicle sides with one another. If the amount of this difference exceeds a predetermined threshold value $\delta\Omega_{threshold1}$, the method according to the invention is suspended and there is a return to step 1.2. Otherwise, the method continues with the execution of step 1.4.

Another possibility for checking the transverse acceleration is, according to step 1.3.4.2, to compare the amount of the difference between the average values of the wheel speeds of the wheels of the axles AVRA and AVFA with a predetermined threshold value $\delta AV_{threshold2}$. With an increase in transverse acceleration $a_q$, the result of an understeering or oversteering driving behavior is that the wheels on the front and rear axles on the same vehicle side run on different path curves and therefore have different wheel speeds. In other words, the method according to the invention is suspended when the amount of the difference between the average values of the wheel speeds of the wheels of the two axles AVRA and AVFA is above the predetermined threshold value $\delta AV_{threshold2}$. Otherwise, the method according to the invention continues with the execution of step 1.4. It is possible, of course, to combine step 1.3.4.2 with step 1.3.1.2, since the check is identical, although the threshold values $\delta AV_{threshold1}$ and $\delta AV_{threshold2}$ to be checked can differ from one another.

According to step 1.4, a matching of the wheel speeds is carried out by providing each of the wheel speeds of the wheels of the rear axle with a matching factor, in such a way that the speed of the right rear wheel corresponds to the speed of the right front wheel and the speed of the left rear wheel corresponds to the speed of the left front wheel. It is also possible, of course, to provide each of the wheels of the front axle with a matching factor, so that the speed of the right front wheel corresponds to the speed of the right rear wheel and the speed of the left front wheel corresponds to the speed of the left rear wheel. As a result of the matching factors, matched wheel speeds $\Omega_{vlmatch}$, $\Omega_{vrmatch}$, $\Omega_{hlmatch}$ and $\Omega_{hrmatch}$ are thus obtained from measured wheel speeds $\Omega_{vl}$, $\Omega_{vr}$, $\Omega_{hl}$ and $\Omega_{hr}$.

As an example, the matching factor for the right side of the car can be determined as a quotient of the measured speed of the right front side of the measured speed of the right rear side wheel. This wheel quotient is the matching factor of the right rear wheel. The matched value of the right rear wheel, $\Omega_{hrmatch}$, is found by multiplication of the measured speed of the right rear wheel with the quotient. The matched value of the right front wheel will then be identical to the measured value of the right front wheel. The matched value for the left side is determined in a similar manner. Alternatively, the matching factor can be the quotient of the measured speed of the right rear side wheel to the right front side wheel.

Figure 1B:
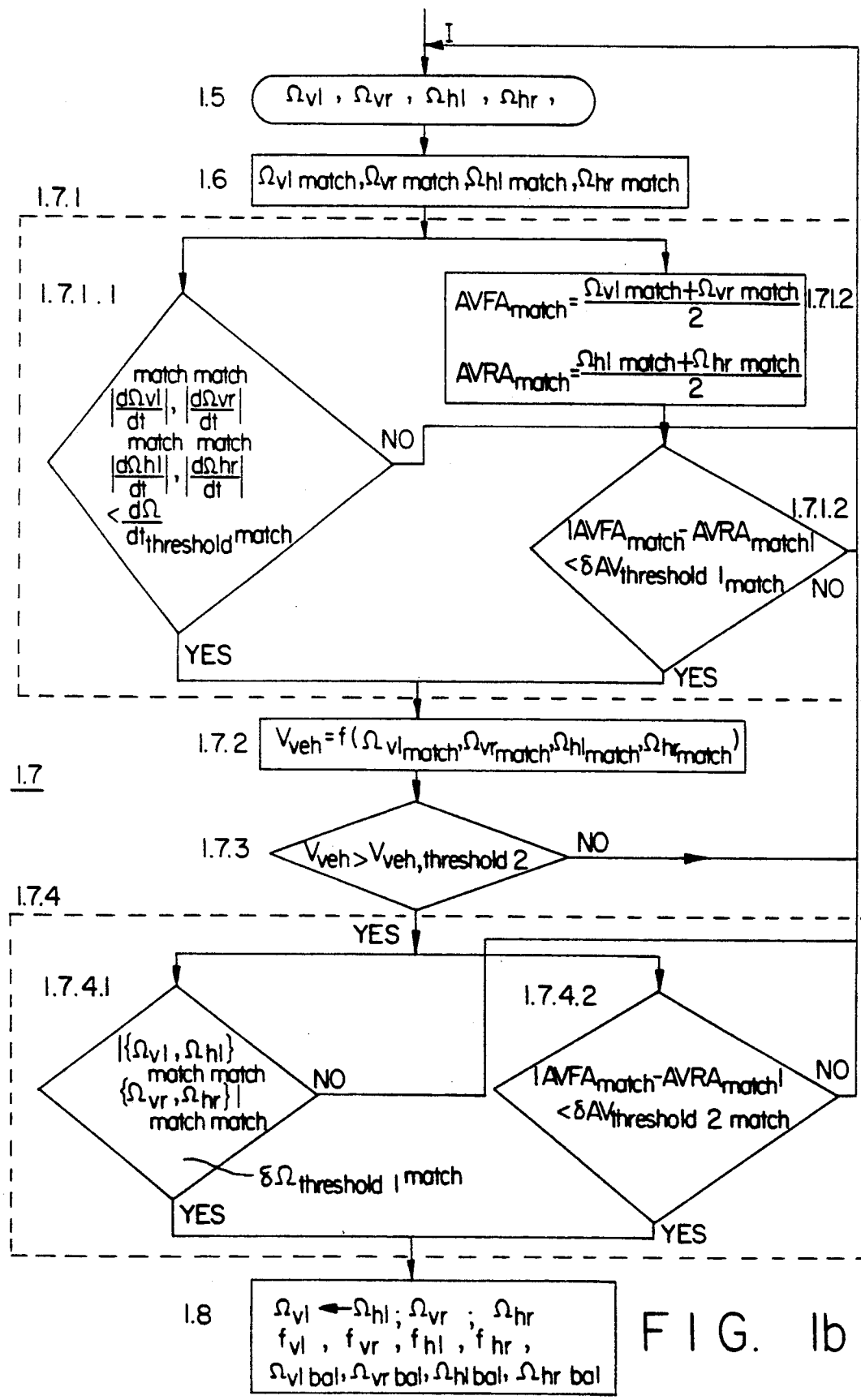

In the second part of the method according to the invention, shown in FIG. 1b, the wheel speeds $\Omega_{vl}$, $\Omega_{vr}$, $\Omega_{hl}$ and $\Omega_{hr}$ are measured once again according to step 1.5. In step 1.6, in accordance with the matching factors determined in step 1.4, matched wheel speeds $\Omega_{vlmatch}$, $\Omega_{vrmatch}$, $\Omega_{hlmatch}$ and $\Omega_{hrmatch}$ are derived from these measured wheel speeds $\Omega_{vl}$, $\Omega_{vr}$, $\Omega_{hl}$ and $\Omega_{hr}$.

In step 1.7, the driving state of the vehicle is derived from the matched wheel speeds $\Omega_{vlmatch}$, $\Omega_{vrmatch}$, $\Omega_{hlmatch}$ and $\Omega_{hrmatch}$ that were derived earlier. It is first established, in step 1.7.1, whether the vehicle is being accelerated or braked. This can be carried out, according to step 1.7.1.1, by a time differentiation of the matched wheel speeds $\Omega_{vlmatch}$, $\Omega_{vrmatch}$, $\Omega_{hlmatch}$ and $\Omega_{hrmatch}$. If the amount of the wheel accelerations $d\Omega_{vlmatch}/dt$, $d\Omega_{vrmatch}/dt$, $d\Omega_{hlmatch}/dt$ and $d\Omega_{hrmatch}/dt$ thus determined is below a predetermined threshold value $d\Omega/dt_{threshold}$, it can be concluded that the vehicle is being neither accelerated nor braked. The subscript "match" has been placed higher in the drawing merely for representative reasons. According to step 1.7.1.2, this check can also be carried out by forming the average value $AVFA_{match}$ of the wheel speeds of the front axle according to the equation:

$$AVFA_{match} = (\Omega_{vlmatch} + \Omega_{vrmatch})/2$$

and the average value $AVRA_{match}$ of the wheel speeds of the rear axle according to the equation:

$$AVRA_{match} = (\Omega_{hlmatch} + \Omega_{hrmatch})/2.$$

If the amount of the difference between the two average values $AVFA_{match}$ and $AVRA_{match}$ is below a threshold value $\delta AV_{threshold1match}$, it can likewise be derived from this that the vehicle is being neither accelerated nor braked. If, in step 1.7.1, it is detected that the vehicle is being accelerated or braked, the second part of the method according to the invention is suspended by causing a return to step 1.5. Otherwise, a transfer to step 1.7.2 takes place.

In step 1.7.2, the vehicle speed $V_{veh}$ is derived from at least one of the matched wheel speeds $\Omega_{vlmatch}$, $\Omega_{vrmatch}$, $\Omega_{hlmatch}$ and $\Omega_{hrmatch}$ that were derived earlier. Advantageously, this is carried out by averaging a plurality of these derived matched wheel speeds. The wheels speeds of the wheels of the non-driven axle of the vehicle can thus be used especially advantageously.

According to step 1.7.3, a check is then made as to whether the vehicle speed $v_{veh}$ is above a threshold value $v_{veh,threshold2}$. A possible order of magnitude for this threshold value $v_{veh,threshold2}$ is of the order of magnitude of approximately 60–80 km/h. If the vehicle speed $v_{veh}$ is below the threshold value $v_{veh,threshold2}$, the second part of the process according to the invention is suspended by causing a return to step 1.5. Otherwise, a transfer to step 1.7.4 takes place.

In step 1.7.4, a check is made as to whether the transverse acceleration $a_q$ is below a predetermined threshold value $a_{q,threshold1match}$. According to step 1.7.4.1, this check can be carried out, for example, by comparing the wheel speeds of wheels of one axle on different vehicle sides with one another. If the amount of this different exceeds a predetermined threshold value $\delta\Omega_{threshold1match}$, the second part of the process according to the invention is suspended and there is a return to step 1.5. Otherwise, the process continues with the execution of step 1.8.

Another possibility for checking the transverse acceleration is, according to step 1.7.4.2, to compare the amount of the difference between the average values of the wheel speeds of the wheels of the two axles $AVRA_{match}$ and $AVFA_{match}$ with a predetermined threshold value $\delta AV_{threshold2match}$. With an increasing transverse acceleration $a_1$, the result of an understeering or oversteering driving behavior is that the wheels of the front and rear axles on the same vehicle side run on different path curves and therefore have different wheel speeds. In other words, the second part of the method according to the present invention is suspended when the amount of the difference between the average values of the wheel speeds of the wheels of the two axles $AVRA_{match}$ and $AVFA_{match}$ is above the predetermined threshold value $\delta AV_{threshold2match}$. Otherwise, the method according to the invention continues with the execution of step 1.8. It is possible, of course, to combine step 1.7.4.2 with step 1.7.1.2, since the check is identical, although the threshold values $\delta AV_{threshold1match}$ and $\delta AV_{threshold2match}$ to be investigated can differ from one another.

In step 1.8, a balancing of the wheel speeds measured in step 1.5 then takes place, in that the speeds of all vehicle wheels are balanced with a reference wheel by determining the particular associated balancing factor $f_{vl}$, $f_{vr}$, $f_{hl}$ and $f_{hr}$. The exemplary embodiment of FIG. 1b shows that the right front wheel, the left rear wheel and the right rear wheel are balanced with the left front wheel as a reference wheel. This then means, therefore, that the balanced wheel speeds $\Omega_{vlbal}$, $\Omega_{vrbal}$, $\Omega_{hlbal}$ and $\Omega_{hrbal}$ coincide with the measured wheel speed $\Omega_{vl}$ of the reference wheel. It is also possible, however, to select one of the other wheels as a reference wheel and to balance the other wheels with this reference wheel accordingly. The balanced wheel speeds $\Omega_{vlbal}$, $\Omega_{vrbal}$, $\Omega_{hlbal}$ and $\Omega_{hrbal}$ are thus obtained from the measured wheel speeds $\Omega_{vl}$, $\Omega_{vr}$, $\Omega_{hl}$ and $\Omega_{hr}$.

Figure 2:
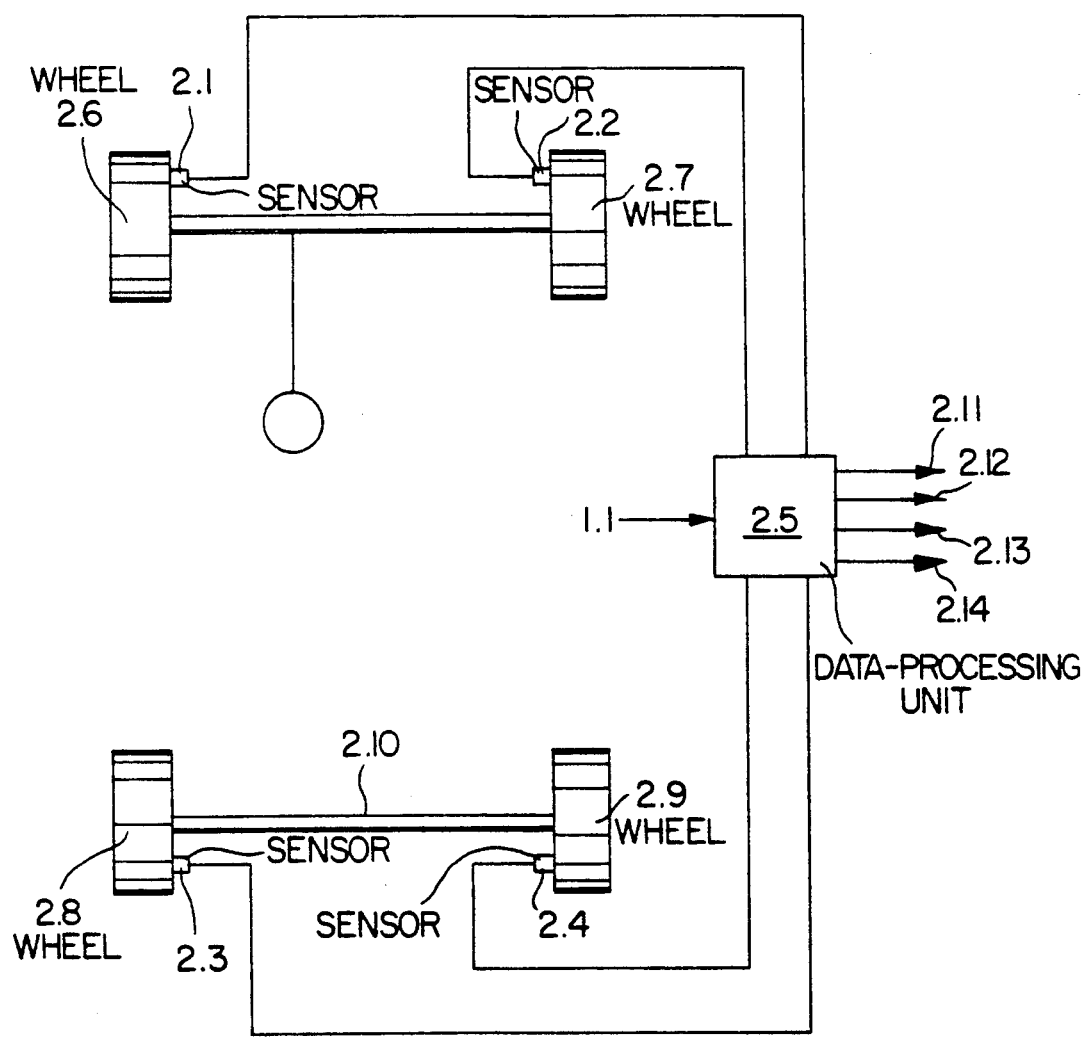
FIG. 2 shows a representation of the necessary wheel sensors and of a data-processing unit for carrying out the method according to the invention.

An arrangement of sensors 2.1, 2.2, 2.3 and 2.4 with an associated conventional data-processing unit 2.5 for the carrying out of the method according to the invention can be taken from the representation of FIG. 2. FIG. 2 shows an arrangement of sensors, in which each wheel 2.6, 2.7, 2.8 and 2.9 is assigned a sensor 2.1, 2.2, 2.3 and 2.4 for measuring the wheel speed. It is also possible to conduct an appropriate balancing of the measured wheel speeds $\Omega_{vl}$, $\Omega_{vr}$, $\Omega_{hl}$ and $\Omega_{hr}$, for example if the two sensors 2.3 and 2.4 of the wheels 2.8 and 2.9 of the rear axle 2.10 are combined to form one sensor, by means of which, for example, the speed of the rear-axle drive shaft is then measured.

The method according to the present invention is carried out in the data-processing unit 2.5 when the signal 1.1 appears. Different dynamic wheel radii occur not only when there are tire defects, but also as a result of a loss of air pressure in the tire and the wear of the tires. This signal can be generated, for example, by a control unit (not illustrated) after a particular mileage covered by the vehicle or at specific time intervals, the time intervals and the mileage appropriately being selected so that, under general conditions, it can be reckoned that there is a loss of air pressure expressed by a change of the dynamic wheel radii.

The output signals 2.11, 2.12, 2.13 and 2.14 coming from the data-processing unit 2.6 represent the balancing factors $f_{vl}$, $f_{vr}$, $f_{hl}$ and $f_{hr}$ determined in step 1.8 of the method flow according to FIG. 1b and are then used to balance wheel speeds $\Omega_{vl}$, $\Omega_{vr}$, $\Omega_{hl}$ and $\Omega_{hr}$ measured thereafter by multiplying the corresponding measured wheel speeds $\Omega_{vl}$, $\Omega_{vr}$, $\Omega_{hl}$ and $\Omega_{hr}$ by the balancing factors $f_{vl}$, $f_{vr}$, $f_{hl}$, $f_{hr}$ determined, so that the balanced wheel speeds $\Omega_{vlbal}$, $\Omega_{vrbal}$, $\Omega_{hlbal}$ and $\Omega_{hrbal}$ are obtained from them. Different dynamic wheel radii $R_{dyn}$ of the individual wheels can thus be equalized. The wheel speeds $\Omega_{vlbal}$, $\Omega_{vrbal}$, $\Omega_{hlbal}$ and $\Omega_{hrbal}$ balanced in this way can then advantageously be used as input 10 signals for controls or regulations of chassis systems, such as, for example, anti-lock systems (ABS), drive-slip controls (ASR) or other systems. In the exemplary embodiment of FIGS. 1a and 1b, in step 1.8 all the vehicle wheels have been balanced with the left front wheel as a reference wheel. In this case, therefore, the balancing factors $f_{vl}$, $f_{vr}$, $f_{vl}$ and $f_{hr}$ are thus obtained according to the equations:

$$f_{vl}=\Omega_{vl}/\Omega_{vl},\ f_{vr}=\Omega_{vr}/\Omega_{vl},\ f_{hl}=\Omega_{hl}/\Omega_{vl}\ \text{and}\ f_{hr}=\Omega_{hr}/\Omega_{vl},$$

that is to say, in particular, that in the exemplary embodiment of FIG. 1 the balancing factor $f_{vl}$ is equal to 1.

The actual programming of a conventional data-processing unit to perform the individual calculations of the average wheel speeds, the matching factors and the balancing factors, as well as the comparisons to threshold values, and to follow the method of the invention described above, are well within the level of one of ordinary skill in the art using the disclosure of the present invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for correcting the rotational speeds of vehicle wheels determined by wheel sensors, comprising:

measuring wheel speeds of individual wheels of a vehicle;

determining balancing factors of the individual wheels under specific driving conditions, the specific driving conditions being that the vehicle is being neither accelerated nor braked and has no transverse acceleration;

in a first part of the method, matching the measured wheel speeds under the specific driving conditions and when the vehicle speed is below a first threshold value, the vehicle speed and the specific driving conditions being determined from the measured wheel speeds, the matching of the measured wheel speeds including the step of determining a matching factor for each of the two vehicle sides so that the matched wheel speeds are obtained from the measured wheel speeds that are associated with the matched wheel speeds;

one of the two matched wheel speeds of the left vehicle side being equal to its associated measured wheel speed, and the other of the two matched wheel speeds of the left vehicle side being obtained from its associated measured wheel speed by multiplying the matching factor of the left vehicle side, in such a way that the two matched wheel speeds of the left vehicle side have the same value;

one of the two matched wheel speeds of the right vehicle side being equal to its associated measured wheel speed and the other of the two matched wheel speeds of the right vehicle side being obtained from its associated measured wheel speed by multiplying the matching factor of the right vehicle side, in such a way that the two matched wheel speeds of the right vehicle side have the same value;

in a second part of the method, measuring the wheel speeds again to provide newly measured wheel speeds;

balancing the newly measured wheel speeds under the specific driving conditions and when the condition that the vehicle speed is above a second threshold value is satisfied, to thereby provide balanced wheel speeds;

determining from the newly measured wheel speeds, with the matching factors being taken into account, the vehicle speed and the specific driving conditions;

wherein the step of balancing includes fixing one of the individual vehicle wheels as a reference wheel and determining a balancing factor for each individual vehicle wheel in relation to said reference wheel, in such a way that the balanced wheel speed coincides with the wheel speed of the reference wheel, and correcting measurements of wheel speeds measured after the balancing step by multiplying the wheel speeds measured after the balancing step by the corresponding determined balancing factors.

2. The method of claim 1, further including the step of updating the balancing factors at specific time intervals.

3. The method of claim 1, further including the step of updating the balancing factors according to a specific distance covered by the vehicle.

4. The method of claim 3, further including determining a criterion for the updating of the balancing factors by taking weighted account of the time interval between the last updating of the balancing factors and the distance covered by the vehicle after said last update.

5. The method of claim 1, wherein the specific driving conditions that the vehicle is being neither accelerated nor braked is derived in the first part of the method when a wheel acceleration or wheel accelerations formed from the measured wheel speed or measured wheel speeds are below a third threshold value.

6. The method of claim 1, wherein the specific driving conditions that the vehicle is being neither accelerated nor braked is derived in the first part of the method when the amount of the difference between the average value of the wheel speeds of the front axle and the average value of the wheel speeds of the rear axle is below a third threshold value.

7. The method of claim 1, wherein the specific driving condition that the vehicle has no transverse acceleration is derived in the first part of the method when the amount of the difference between the average value of the wheel speeds of the front axle and the average value of the wheel speeds of the rear axle is below a third threshold value.

8. The method of claim 1, wherein the specific driving condition that the vehicle has no transverse acceleration is derived in the first part of the method when the amount of the difference between wheel speeds of wheels, which are mounted on different vehicle sides on the same axle, falls below a third threshold value.

9. The method of claim 1, wherein the specific driving conditions that the vehicle is being neither accelerated nor braked is derived in the second part of the method when a wheel acceleration or wheel accelerations formed from at least one of the matched wheel speeds are below a third threshold value.

10. The method of claim 1, wherein the specific driving conditions that the vehicle is being neither accelerated nor braked is derived in the second part of the method when the amount of the difference between the average value of the wheel speeds of the front axle and the average value of the wheel speeds of the rear axle is below a third threshold value.

11. The method of claim 1, wherein the specific driving condition that the vehicle has no transverse acceleration is derived in the second part of the method when the amount of the difference between the average value of the wheel speeds of the front axle and the average value of the wheel speeds of the rear axle is below a third threshold value.

12. The method of claim 1, wherein the specific driving condition that the vehicle has no transverse acceleration is derived in the second part of the method when the amount of the difference between matched wheel speeds of wheels, which are mounted on different vehicle sides on the same axle, falls below a third threshold value.

13. The method of claim 1, wherein the specific driving conditions that the vehicle is being neither accelerated nor braked is derived in at least one of the first and second parts of the method from control signals of at least one of an anti-lock system and a drive-slip control system.

14. The method of claim 2, further including determining a criterion for the updating of the balancing factors by taking weighted account of the time interval between the last updating of the balancing factors and the distance covered by the vehicle after said last update.

* * * * *